Patented Apr. 15, 1941

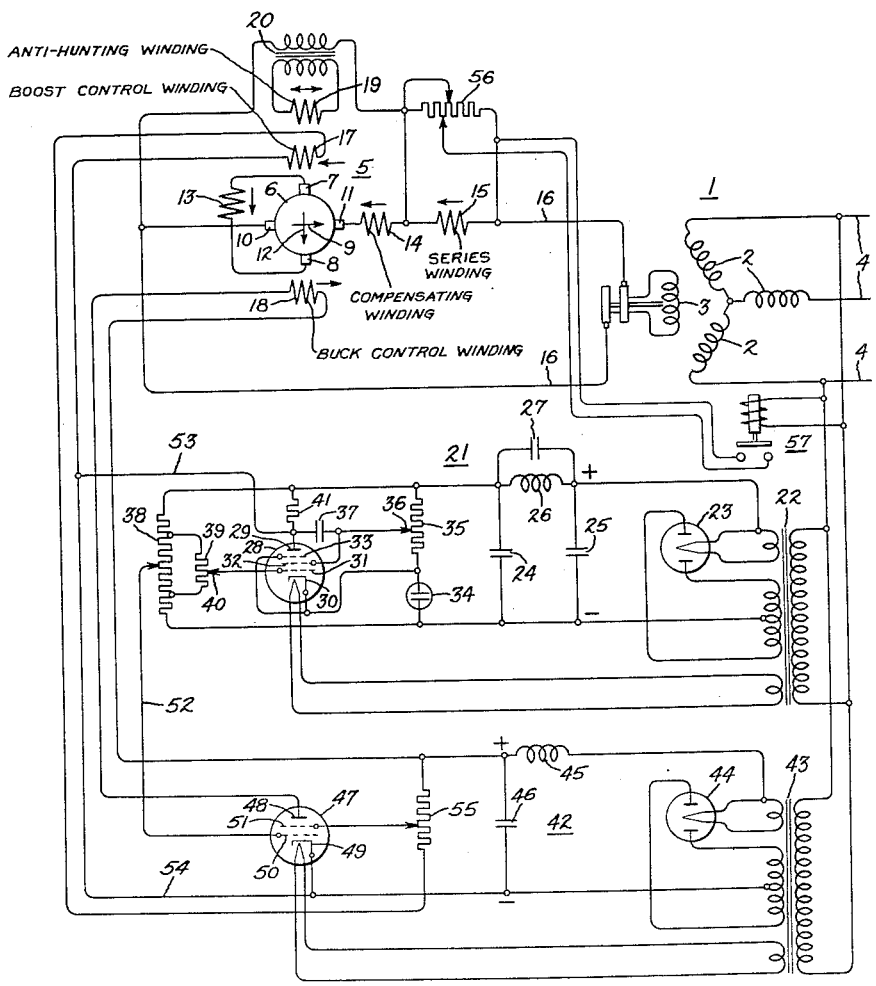

2,238,811

UNITED STATES PATENT OFFICE 2,238,811

ELECTRIC REGULATING SYSTEM

Frederick E. Crever, Schenectady, N. Y., assignor to General Electric Company, a corporation of New York Application September 20, 1940, Serial No. 357,590

8 Claims. (Cl. 171—223)

My invention relates to electric regulating systems and more particularly to systems including dynamo-electric machines of the armature reaction excited type.

In the control of an electrical condition, such as the output voltage of a dynamo-electric machine, it is frequently desirable to control not only the output voltage of the machine under normal operating conditions, but also to provide means which will initiate the operation of the system in the event the auxiliary or separate source of energizing current fails. In such systems, it is frequently necessary to provide this type of control when other sources of voltage are not available.

My invention described hereinafter is an improvement of my joint invention disclosed and claimed in a copending patent application Serial No. 333,786, filed May 7, 1940, and assigned to the assignee of the present application.

It is an object of my invention to provide a new and improved electric regulating system.

It is another object of my invention to provide a new and improved electric regulating system for dynamo-electric machines.

It is a further object of my invention to provide a new and improved regulating system for dynamo-electric machines of the armature reaction excited type.

It is a still further object of my invention to provide a new and improved electric valve regulating system for dynamo-electric machines.

Briefly stated, in the illustrated embodiment of my invention I provide a regulating system for a dynamo-electric machine of the armature reaction excited type which under normal operating conditions is energized from an electric circuit connected to the armature winding of a main dynamo-electric machine, such as an alternating current generator of the synchronous type. During the starting operation, inasmuch as field excitation is not available for the armature reaction excited machine, I provide new and improved regulating equipment for controlling the excitation of the armature reaction excited machine so that its output voltage will automatically build up, and in turn, build up the excitation of the synchronous alternating current generator.

For a better understanding of my invention, reference may be had to the following description taken in connection with the accompanying drawing, and its scope will be pointed out in the appended claims. The single figure of the accompanying drawing diagrammatically illustrates an embodiment of my invention as applied to an excitation system for a synchronous alternating current dynamo-electric machine, such as a synchronous generator.

Referring now to the single figure of the drawing, I have there illustrated my invention as applied to a regulating system for a dynamo-electric machine, such as an alternating current generator 1, of the synchronous type having armature windings 2 and a field winding 3. The armature windings 2 may be connected to a suitable alternating current circuit 4.

I provide, as a means for controlling the energization of the field winding 3, an exciter 5 which is a dynamo-electric machine of the armature reaction excited type comprising a rotatable member or armature 6, a commutator, not shown, and a set of primary brushes 7 and 8 which produce a primary armature reaction having an axis lying in the direction of the arrow 9. In addition, the exciter 5 comprises a set of secondary brushes 10 and 11 which produce a secondary armature reaction lying along the direction of the arrow 12. Primary brushes 7 and 8 and secondary brushes 10 and 11 provide, respectively, primary and secondary circuits through the armature or rotating member 6 of exciter 5. A field winding 13 may be connected across the primary brushes 7 and 8, if desired. The field winding 13 is preferably mounted on the frame or stationary structure of exciter 5 and produces a magnetomotive force along the axis of the primary armature reaction. Excitation means are connected in series relation with the secondary armature circuit of exciter 5 and may comprise a series or compensating winding 14 and a series winding 15. The output circuit 16 of the exciter 5 is connected to the field winding 3 which constitutes a load circuit for the exciter. Exciter 5 is also provided with a pair of control windings 17 and 18 also mounted on the stationary structure of the exciter 5 and arranged to produce magnetomotive forces along the axis of the primary armature reaction. In the particular embodiment of my invention here employed, the control windings 17 and 18 are arranged to produce opposing magnetomotive forces. Winding 17 may be referred to as the boost control winding and winding 18 may be referred to as the buck control winding. In addition, in order to stabilize the operation of the exciter 5 in variably energizing the field winding 3 of generator 1 to maintain a predetermined electrical condition thereof, such as the armature output voltage, substantially constant, I employ an anti-hunting winding 19. The anti-hunting winding 19 may be energized by means of a transformer 20 which is connected to be responsive to the output voltage of the exciter 5.

In order to energize variably the control windings 17 and 18 in response to a predetermined controlling influence, such as the armature voltage of dynamo-electric machine 1, I provide a control circuit 21 which produces a unidirectional voltage the magnitude of which varies in response to the magnitude of the controlling influence. Circuit 21 may include a transformer 22 and a rectifier 23 which may be of the full-wave type for producing a unidirectional voltage the magnitude of which varies in response to the magnitude of the armature voltage of generator 1. A suitable filter circuit including capacitances 24 and 25 and inductance 26 may be connected across the output circuit of the rectifier 23 to absorb the ripple voltage. A further filtering capacitance 27 may be connected across inductance 26, if desired. Control circuit 21 includes an electric discharge device 28, preferably of the high vacuum type, having an anode 29, a cathode 30, a control grid 31, a screen grid 32 and a suppressor grid 33, which is preferably connected to the cathode 30. As a means for accentuating the unidirectional voltage variations provided by circuit 21 in the control of the conductivity of the electric valve means 28, I provide a voltage divider including a serially connected constant voltage device, such as a glow discharge device 34, and a resistance or voltage divider 35. An adjustable contact 36 of the voltage divider 35 is connected to the screen grid 32 and impresses thereon a potential the magnitude of which varies in response to the unidirectional voltage produced by rectifier 23. A capacitance 37 may be connected between the anode 29 and the screen grid 32 in order to absorb extraneous transient voltage variations, thereby stabilizing the operation of the control circuit 21. In order to increase the sensitivity of electronic discharge device 28 in response to the unidirectional voltage, I provide a voltage divider including a resistance 38 and a resistance 39 which may be connected across at least a portion of the resistance 38 and is provided with an adjustable contact 40. In this manner, the variation in the current conducted by the electric discharge device 28 is substantially increased to improve the sensitivity of the regulating system. I provide in series relation with the anode-cathode circuit of the electric discharge device 28, a suitable impedance element, such as a resistance 41, to produce a control voltage the function of which is explained hereinafter.

I also provide a second control circuit 42 which may include a transformer 43 and a rectifier 44 which produce a unidirectional voltage the magnitude of which also varies in response to the predetermined controlling influence which, in the illustrated embodiment, is the armature voltage of the synchronous generator 1. A filter circuit comprising an inductance 45 and a capacitance 46 may be connected across the output circuit of the rectifier 44.

I provide an electric discharge device 47, preferably of the high vacuum type, for controlling the current transmitted to the control winding 18. Discharge device 47 includes an anode 48, a cathode 49, a control grid 50, and a screen grid 51. The anode-cathode circuit may be connected in series relation with winding 18, if desired. The conductivity of the electric discharge device 47 is controlled by control circuit 21. The potential of the control grid 50 is varied in response to the unidirectional voltage produced by control circuit 21 through a conductor 52 which connects the control grid 50 to resistance 38. A second controlling relationship between control circuit 21 and discharge device 47 is effected by means of the resistance 41 which is connected to the cathode 49 of discharge device 47 through conductors 53 and 54. These elements are arranged so that upon an increase of current by discharge device 28, the conductivity of the device 47 is also increased, thereby increasing the current transmitted to the buck control winding 18.

The conductivity of the electric discharge device 47 is further controlled in response to the magnitude of the controlling influence by means of a circuit comprising a resistance 55, one terminal of which is connected to the positive conductor of control circuit 42, and the other terminal of which is connected to the negative terminal of circuit 42 through the boost control winding 17. The potential of the grid 51 is not only responsive to the magnitude of the controlling influence, but is also responsive to the magnitude of the current conducted to boost control winding 17, thereby introducing an anti-hunting or stabilizing effect.

As a means for controlling the excitation of the armature reaction excited machine or exciter 5 during the starting operation, that is, when circuit 4 is not energized, I provide means for controlling the effective resistance of the circuit or excitation means connected to secondary brushes 10 and 11. This means may comprise a variable impedance or resistance 56 which is connected across one of the windings, such as series winding 15. In addition, I provide a suitable means responsive to the energization of circuit 4, such as a voltage responsive relay 57, which will permit initiation of the system on self-excitation, the function of relay 57 being to limit the voltage of circuit 4 to a value not injurious to the equipment until such time as the vacuum tube filaments of the electric valves have been heated to a point which permits the electric valves to assume control.

The operation of the embodiment of my invention shown in the single figure of the accompanying drawing will be explained by considering the system when it is operating to control the excitation of synchronous generator 1 to maintain the armature or output voltage thereof substantially constant. The armature reaction excited machine or exciter 5 controls the energization of field winding 3 in response to the armature voltage. The magnitude of the field current transmitted to field winding 3 is determined by the excitation of exciter 5. The output voltage or the voltage appearing across secondary brushes 10 and 11 is determined by the magnetization of the exciter 5 and is controlled primarily by the resultant magneto-motive force or the magnetic field produced by control windings 17 and 18. In the particular arrangement illustrated, the control winding or boost winding 17 is arranged to produce the predominating magnetomotive force and the control winding 18 is arranged to produce an opposing magnetomotive force of lesser value. While the variations in the energization of the boost winding 17 are very small, depending upon the variations in the armature voltage of generator 1, the controlling effect is accomplished principally by means of the variable energization of the buck control winding 18. In this manner, the resultant field of the exciter 5 is determined essentially by the energization of the buck winding 18.

Electric discharge devices 28 and 47 operate essentially as amplifiers to transmit to control winding 18 a variable unidirectional current, the magnitude of which varies in accordance with the armature voltage of generator 1. Electric discharge device 28 controls the conductivity of discharge device 47 by virtue of the variations in voltage appearing across the terminals of resistance 41. If it be assumed that the armature voltage tends to rise above the predetermined or preestablished value, the current conducted by electric discharge device 28 will increase due to the increase of potential impressed upon control grid 31 and screen grid 32. Consequently, the potential of cathode 49 of electric discharge device 47 will be lowered, resulting in an effective increase in potential between control grid 50 and cathode 49, thereby causing the electric discharge device 47 to conduct an increased amount of current to control winding 18. Inasmuch as the winding 18 opposes winding 17, the magnetization of exciter 5 will be decreased effecting a reduction in the output voltage thereof and decreasing the current transmitted to field winding 3. The armature voltage of the generator 1 will be restored to the desired value. In like manner, the regulating system operates to raise the voltage to the desired value if the armature voltage decreases below the preestablished or predetermined value.

Referring more particularly to the operation of electric discharge device 47, it will be noted that the control of discharge device 47 is made very sensitive to the variations in the armature voltage of generator 1 by impressing on screen grid 51 a voltage which varies in response to the output voltage of the second control circuit 42 through the voltage divider including resistance 55. That is, the conductivity of the electric discharge device 47 varies in response to the unidirectional output voltage of both control circuits 21 and 42. Furthermore, an anti-hunting or stabilizing effect is introduced in the control of the energization of control winding 18 by virtue of the fact that the voltage impressed on screen grid 51 also varies in response to the current transmitted to the boost control winding 17. A rapid increase of current to the boost control winding 17 also introduces an anti-hunting effect by effecting a proportionate decrease in the potential of screen grid 51, thereby improving the speed of response and precision of operation of the regulating system.

During the starting operation, in order that the exciter 5 will build up its excitation due to its residual magnetism, it is important to decrease the effective resistance of the circuit connected to secondary brushes 10 and 11. This desirable decrease in resistance may be effected by operation of the adjustable resistance 56, so that exciter 5 will build up its own excitation. Of course, as the voltage of generator 1 builds up, current will be transmitted to windings 17 and 18 to further assist in the build-up of excitation of both exciter 5 and generator 1. Adjustable resistance 56 may also be employed during the starting operation or may be used when the regulating system, including circuits 21 and 42, is out of service due to failure or accident.

The voltage responsive means 57 is provided to allow the equipment to be automatically started up without the necessity of manual adjustment of variable resistor 56. Until such time as the tube filaments heat up, the control circuits cannot assume control in the normal manner. Relay 57, by closing its contacts to decrease the resistance to a definite value across series winding 15, limits the voltage to a value which is only slightly above normal and, therefore, not injurious until such time as the temperature of the filaments of the various electronic discharge devices permits them to take control.

An important advantage of apparatus built in accordance with my invention is the provision of means for accomplishing and controlling the build-up of self-excited machines of the armature reaction excited type independently of auxiliary sources of control current. Heretofore, in machines of the armature reaction excited type auxiliary sources of current have been employed to build up the excitation of the exciter.

While I have shown and described my invention as applied to a particular system of connections and as embodying various devices diagrammatically shown, it will be obvious to those skilled in the art that changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a load circuit, a dynamo-electric machine of the armature reaction excited type comprising a stationary member and a rotatable member provided with a commutator and including a set of primary brushes and a set of secondary brushes electrically displaced from said primary brushes and adapted to provide a primary and secondary circuit respectively through said rotatable member, a pair of control windings mounted on said stationary member and arranged to produce opposing magnetomotive forces along the axis of the primary armature reaction, means for connecting said load circuit to said secondary brushes, a control circuit for producing a unidirectional voltage which varies in accordance with a predetermined controlling influence, means for connecting one of said control windings to said control circuit, a second circuit for producing a second unidirectional voltage which varies in accordance with said predetermined controlling influence, means for variably energizing the other control winding from the first mentioned control circuit including an electric discharge device having an anode, a cathode and a pair of control grids, the anode-cathode circuit being connected to said other control winding, means for variably energizing one of the grids from the first mentioned control circuit in response to the voltage of the first mentioned control circuit, means for controlling the conductivity of said electric discharge device in response to the magnitude of the voltage of said second circuit comprising a second electric discharge device, and means responsive to the voltage of said second circuit for impressing a variable control potential on the other grid of the first mentioned electric discharge device.

2. In combination, a load circuit, means for variably energizing said load circuit and comprising a dynamo-electric machine of the armature reaction excited type comprising a stationary member and a rotatable member provided with a commutator and including a set of primary brushes and a set of secondary brushes electrically displaced from said primary brushes and adapted to provide a primary and secondary circuit respectively through said rotatable member, a control winding mounted on said stationary member and arranged to produce a magnetomotive force along the axis of the primary armature reaction, excitation means connected in series relation with said secondary brushes to produce a magnetomotive force along the axis of the primary armature reaction and including a series winding, an electric circuit for variably energizing said control winding in response to a predetermined controlling influence, and means responsive to an electrical condition of said electric circuit to control said excitation means.

3. In combination, a dynamo-electric machine of the armature reaction excited type comprising a stationary member and a rotatable member provided with a commutator and including a set of primary brushes and a set of secondary brushes electrically displaced from said primary brushes and adapted to provide a primary and secondary circuit respectively through said rotatable member, a control winding mounted on said stationary member and arranged to produce a magnetomotive force along the axis of the primary armature reaction, excitation means comprising a winding connected in series relation with said secondary circuit and mounted on said stationary member and arranged to produce a magnetomotive force along the axis of said primary armature reaction, a load circuit connected in series relation with the series winding and said secondary circuit, an electric circuit for energizing said control winding, and means for controlling said excitation means to build up the excitation of the armature reaction excited machine independently of the energization of said control winding.

4. In combination, a dynamo-electric machine of the armature reaction excited type comprising a stationary member and a rotatable member provided with a commutator and including a set of primary brushes and a set of secondary brushes electrically displaced from said primary brushes and adapted to provide a primary and secondary circuit respectively through said rotatable member, a control winding mounted on said stationary member and arranged to produce a magnetomotive force along the axis of the primary armature reaction, excitation means comprising a winding connected in series relation with said secondary circuit and mounted on said stationary member and arranged to produce a magnetomotive force along the axis of said primary armature reaction, a load circuit connected in series relation with the series winding and said secondary circuit, an electric circuit for energizing said control winding, and means for controlling said excitation means to build up the excitation of the armature reaction excited machine independently of the state of energization of said electric circuit.

5. In combination, a dynamo-electric machine of the armature reaction excited type comprising a stationary member and a rotatable member provided with a commutator and including a set of primary brushes and a set of secondary brushes electrically displaced from said primary brushes and adapted to provide a primary and secondary circuit respectively through said rotatable member, a control winding mounted on said stationary member and arranged to produce a magnetomotive force along the axis of the primary armature reaction, excitation means comprising a series winding mounted on said stationary member and arranged to produce a magnetomotive force along the axis of said primary armature reaction, a load circuit connected in series relation with said series winding and said secondary circuit, an electric circuit for energizing said control winding, and means for controlling the impedance of said excitation means comprising a resistance connected across said series winding to control the excitation of the armature reaction machine to build up the excitation of said machine independently of the voltage of said electric circuit.

6. In combination, a dynamo-electric machine having an armature winding and a field winding, means for variably energizing said field winding comprising a dynamo-electric machine of the armature reaction excited type comprising a stationary member and a rotatable member provided with a commutator and including a set of primary brushes and a set of secondary brushes electrically displaced from said primary brushes and adapted to provide a primary and secondary circuit respectively through said rotatable member, a control winding mounted on said stationary member and arranged to produce a magnetomotive force along the axis of the primary armature reaction and a series winding mounted on said stationary member and arranged to produce a magnetomotive force along the axis of the primary armature reaction, means for variably exciting said control winding in response to a predetermined electrical condition of the first-mentioned dynamo-electric machine so long as said first-mentioned dynamo-electric machine is excited, and means for controlling the energization of said series winding to build up the excitation of the armature reaction excited machine independently of said last-mentioned means.

7. In combination a dynamo-electric machine having an armature winding and a field winding, means for variably energizing said field winding comprising a dynamo-electric machine of the armature reaction excited type comprising a stationary member and a rotatable member provided with a commutator and including a set of primary brushes and a set of secondary brushes electrically displaced from said primary brushes and adapted to provide a primary and secondary circuit respectively through said rotatable member, a pair of control windings mounted on said stationary member and arranged to produce magnetomotive forces along the axis of the primary armature reaction and a series winding mounted on said stationary member and arranged to produce a magnetomotive force along the axis of the primary armature reaction, means for variably exciting at least one of said control windings, and means connected across said series winding to control the excitation of said first mentioned dynamo-electric machine.

8. In combination, a dynamo-electric machine having an armature winding and a field winding, means for variably energizing said field winding comprising a dynamo-electric machine of the armature reaction excited type comprising a stationary member and a rotatable member provided with a commutator and including a set of primary brushes and a set of secondary brushes electrically displaced from said primary brushes and adapted to provide a primary and secondary circuit respectively through said rotatable member, a pair of control windings mounted on said stationary member and arranged to produce magnetomotive forces along the axis of the primary armature reaction and a series winding mounted on said stationary member and arranged to produce a magnetomotive force along the axis of the primary armature reaction, means for variably exciting at least one of said control windings, and a resistance connected across said series winding to control the build-up of armature voltage of said first mentioned dynamo-electric machine.

FREDERICK E. CREVER.